Fig. 2.

No. 723,250. PATENTED MAR. 24, 1903.
L. T. DERY.
BUNDLE CARRIER AND SHOCK FORMER FOR HARVESTER BINDERS.
APPLICATION FILED MAY 1, 1902.
NO MODEL. 7 SHEETS—SHEET 6.

Witnesses
Inventor
L. T. Dery
Attorneys

No. 723,250. PATENTED MAR. 24, 1903.
L. T. DERY.
BUNDLE CARRIER AND SHOCK FORMER FOR HARVESTER BINDERS.
APPLICATION FILED MAY 1, 1902.
NO MODEL. 7 SHEETS—SHEET 7.

UNITED STATES PATENT OFFICE.

LOUIE T. DERY, OF MONTPELIER, NORTH DAKOTA.

BUNDLE-CARRIER AND SHOCK-FORMER FOR HARVESTER-BINDERS.

SPECIFICATION forming part of Letters Patent No. 723,250, dated March 24, 1903.

Application filed May 1, 1902. Serial No. 105,516. (No model.)

*To all whom it may concern:*

Be it known that I, LOUIE T. DERY, a citizen of the United States, residing at Montpelier, in the county of Stutsman and State of North Dakota, have invented certain new and useful Improvements in Bundle-Carriers and Shock-Formers for Harvester-Binders; and I do hereby declare the following to be a full, clear, and exact description of the invention, such as will enable others skilled in the art to which it appertains to make and use the same.

The purpose of this invention is the provision of an attachment of novel formation to be applied to the various makes of harvester-binders for carrying a number of bundles or gavels of grain and forming them into a shock to be deposited upon the ground in an upright position when the required number of bundles have accumulated.

An essential feature of the invention is the construction of the bundle-carrying and shock-forming mechanism in such a manner as to admit of its ready adaptation to harvester-binders in use with slight changes in the details made necessary in fitting the attachment to any of the various makes and styles of implements.

In its organization the attachment comprises a shock-former of frusto-conical form for reception of the bundles or gavels as soon as they are bound and delivered from the binding mechanism. A retainer normally extends across the base or larger end of the shock-former to hold the bundles in place during the accumulating period or collection of the required number of bundles to form the shock.

The invention further contemplates a novel form of support for the bundles in their passage from the binder-deck to the shock-former, said support embodying a check for arresting the advance of the bundles to the shock-former during the interval of depositing the shock upon the ground and returning the parts to a normal position. Combined with the said check and forming an adjunctive part of the said support for the bundles are means or devices to admit of the said check moving, so that the packers or bundle-ejectors of the binding mechanism may clear the bundle or bundles arrested in their movement to the shock-former, said check returning to a normal position when relieved of the pressure of the said packers or ejectors.

The invention further comprises in combination a self-closing gate for the opening in the side of the shock-former through which the bundles pass, a trip for holding said gate open when the parts are in position for forming a shock, and actuating means for said trip to effect a release of the gate preliminary to depositing the shock upon the ground, the aforementioned check being likewise released about at the same instant with the gate to prevent passage of a bundle or bundles to the shock-former during the dumping or unloading operation.

The invention further consists of the novel elemental construction whereby the attachment may be readily fitted to any harvester-binder and whereby the operating parts are at all times under control of the driver and are accessible for any desired purpose.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Corresponding and like parts are referred to in the following description and indicated in all the views of the drawings by the same reference characters.

The attachment is shown applied to a harvester-binder of ordinary construction, the binder-deck and sufficient of the framework being shown to illustrate the application of the invention.

The numeral 1 indicates the binder-deck, and 2 a portion of the framework. The attachment comprises a shaft 3, journaled in bearings applied to the framework of the harvester-binder and provided with an oblique arm 4 for carrying the shock-former 5 and retainer 6. A hub or collar 7 is secured to the shaft 3, so as to turn therewith, and is provided with oppositely-extending arms 8 and 9. A counterbalancing-spring 10 is connected at its front end to the arm 9 and at its rear end to a brace 11, extended from a bearing of the shaft 3. This spring 10 is of the coil and retractile type and is of sufficient strength and tension to counterbalance the shock-former 5, retainer 6, the parts coöperating therewith, and the shock, thereby enabling the driver to readily control the shock-forming mechanism. The operating-lever 12 is pivoted to a convenient portion of the harvester-framework and extends within reach of the driver's seat 13, and its lower end is bent to form an elbow and is connected by a rod 14 with an arm 15 of a rock-shaft 16, having a second arm 17, connected by a rod 18 with the arm 8. By connecting the lever 12 with the arm 8 in the manner shown provision is had for clearing the binding mechanism, and the shaft 3 is enabled to have a minimum length consistent with a substantial bearing.

Figure 1:
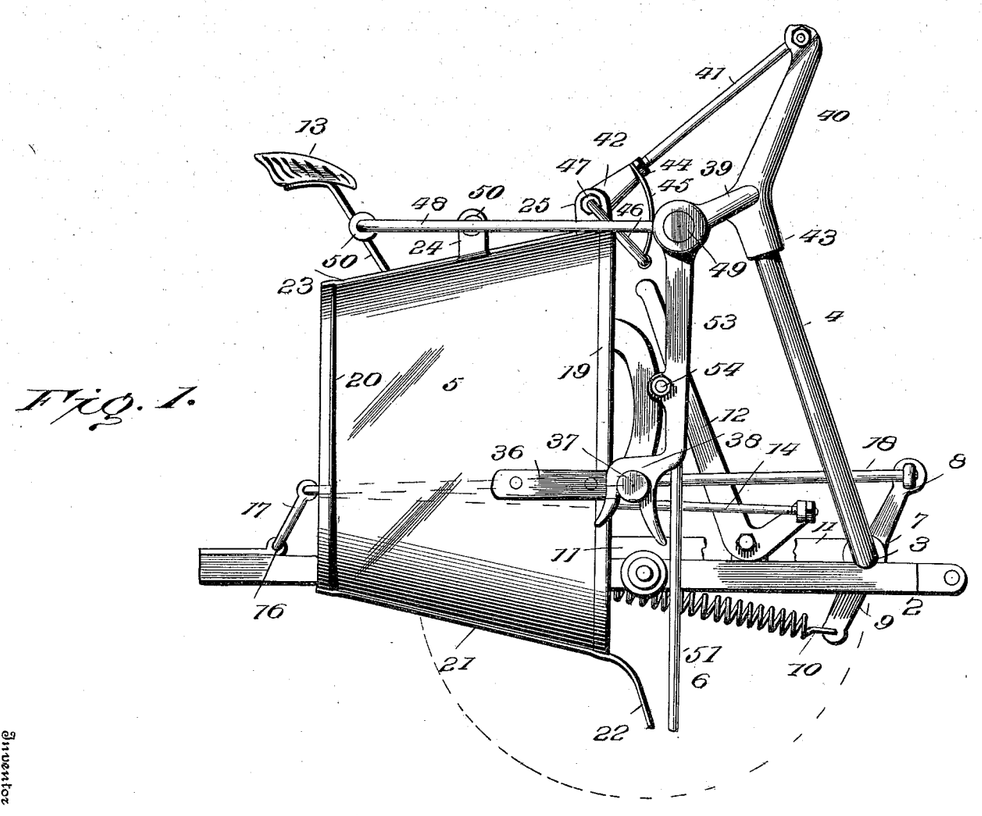
Figure 1 is a side elevation of the invention as it appears when attached to a harvester-binder, the parts being in a normal position, so as to permit formation of the bundles carried into a shock.
Figure 5:
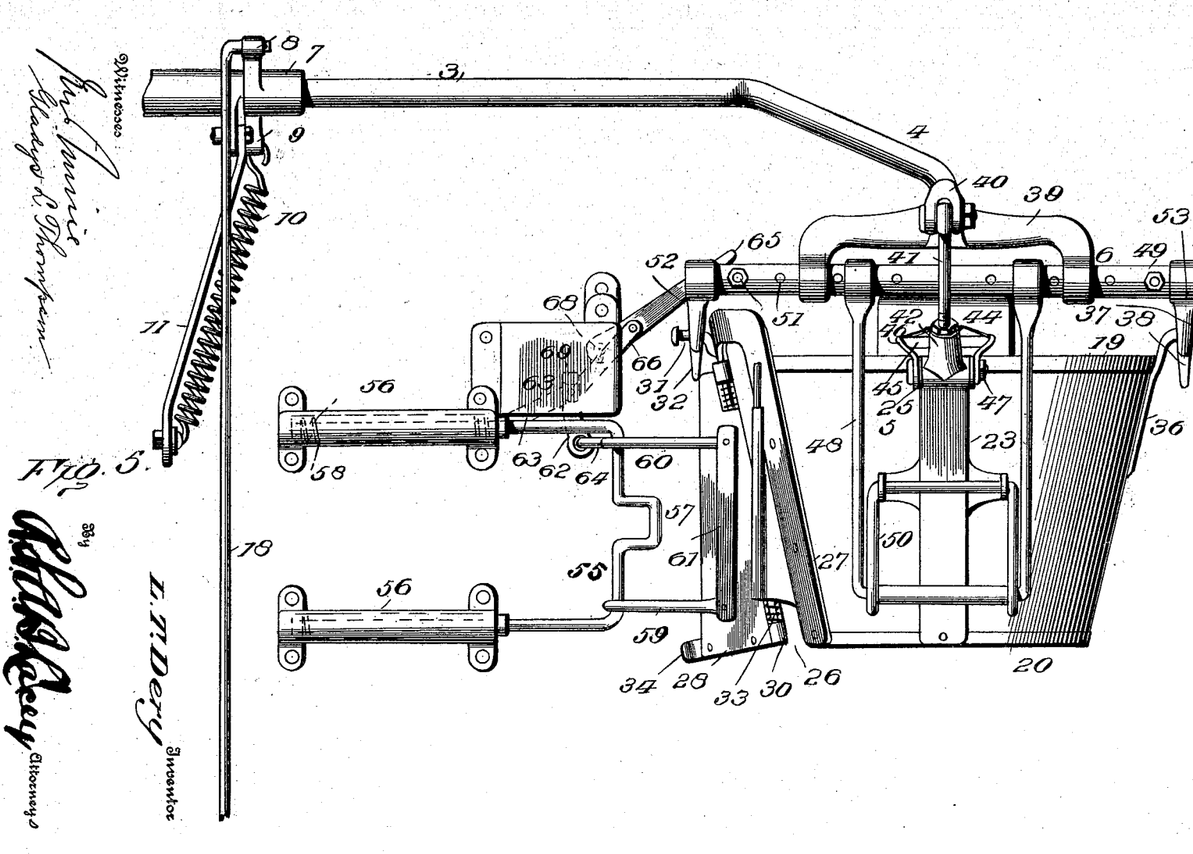
Fig. 5 is a top plan view of the invention, showing the parts in normal position.
Figure 6:
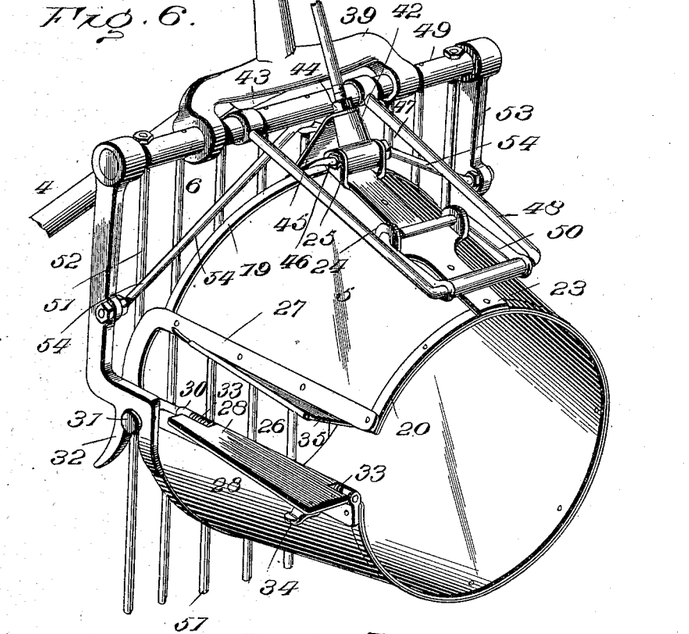
Fig. 6 is a perspective view of the shock-former, the retainer, and the adjunctive parts intimately associated therewith.
Figure 7:
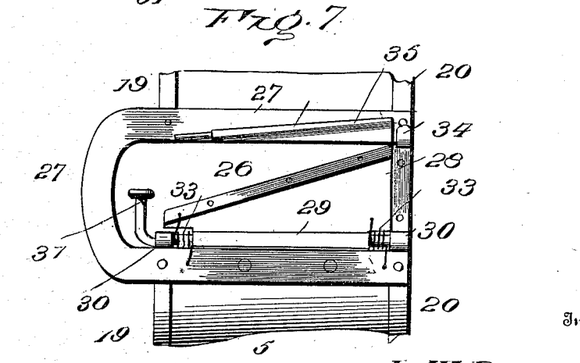
Fig. 7 is a side elevation of the shock-former, showing the opening closed by the gate, the top and bottom portions being broken away.

The shock-former 5 is of frusto-conical form approximating the contour of a shock and normally occupies a horizontal position, as indicated most clearly in Figs. 1, 5, and 6. It is preferably constructed of sheet metal and is reinforced at its ends by metal bands 19 and 20. A strip 21 is applied to the bottom side of the shock-former, and its rear end is widened and downwardly curved, as shown at 22, to form a shoe. The shoe 22 is adapted to come in contact with the ground and properly support the shock-former when from any cause its lower forward end tends downward below a normal position. A corresponding strip 23 is applied to the top side of the shock-former and is formed with upwardly-bent ears 24 and 25 for a purpose presently to be explained. An opening 26 is provided in the side of the shock-former facing the harvester-binder and is reinforced by a frame 27 attached to the bands 19 and 20 and to the edge portions of the body 5 bordering upon the opening 26. A gate 28 is provided for closing the opening 26 during the operation of dumping the shock and is hinged at its lower side to the bottom member of the frame 27 by means of a bar 29, applied to and reinforcing the lower edge of the said gate and journaled in knuckles 30, extended from the member of the frame 27, to which the gate is hinged. The end of the bar 29 adjacent to the larger end of the shock-former is bent about at a right angle, as shown at 31, to be engaged by a fork 32, hereinafter more particularly described. The gate 28 is held closed when released from the fork 32 by means of springs 33, mounted upon end portions of the bar 29 and having end extensions in engagement with the said gate and part of the frame 27. A stop 34 projects from the gate and is adapted to engage with a part of the shock-former bordering upon the opening 26, so as to limit the closing movement of the gate when forced to by the action of the springs 33. A guard or deflector 35 projects outward from the upper side of the opening 26 and serves to direct the bundles through the opening 26 when urged forward by means of the packers or other delivery or ejecting means of the harvester-binder. A strap-iron 36 is attached to the opposite side of the shock-former 5 and is provided with an offstanding part 37 corresponding to the part 31 and adapted to be engaged by a fork 38 at the opposite end of the retainer and to be described more fully hereinafter.

A yoke 39 pivotally supports the retainer 6 and has an upwardly-extended arm 40, to which a rod 41 is pivotally attached, the opposite end of said rod being screw-threaded and adjustably connected with a coupling 42, pivoted between the ears 25. The arm 4 of the shaft 3 is connected to a coupling extension of the yoke 39, as indicated at 43. A jamnut 44 is mounted upon the threaded end of the rod 41, and one end of a metal plate 45 is secured between said jam-nut and the coupling 42, said plate 45 being widened and curved to form a shoe and having its opposite end connected to a fastening 46 with the ears 25, said fastening 46 being links clamped between the ears 25 and nuts 47 at the ends of the pivot-bolt or like fastening attaching the coupling 42 to the said ears 25. A swinging frame 48 is pivotally mounted upon the head or cross-bar 49 of the retainer 6, and its closed end is connected to the shock-former 5 by means of a second frame 50. These frames 48 and 50 are approximately of U shape and constitute a toggle connection between the shock former and retainer.

Figure 2:
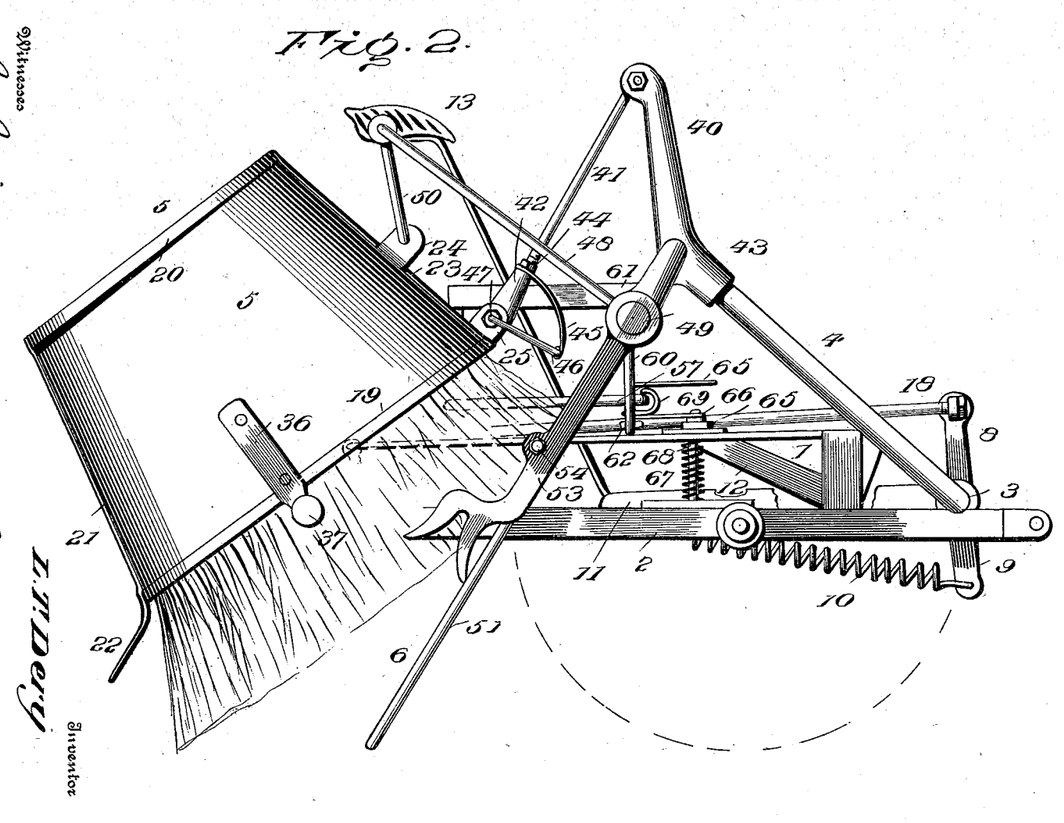
Fig. 2 is a view similar to Fig. 1, showing the relation of the parts during the initial movements when the mechanism is in operation to deposit the shock upon the ground.
Figure 3:
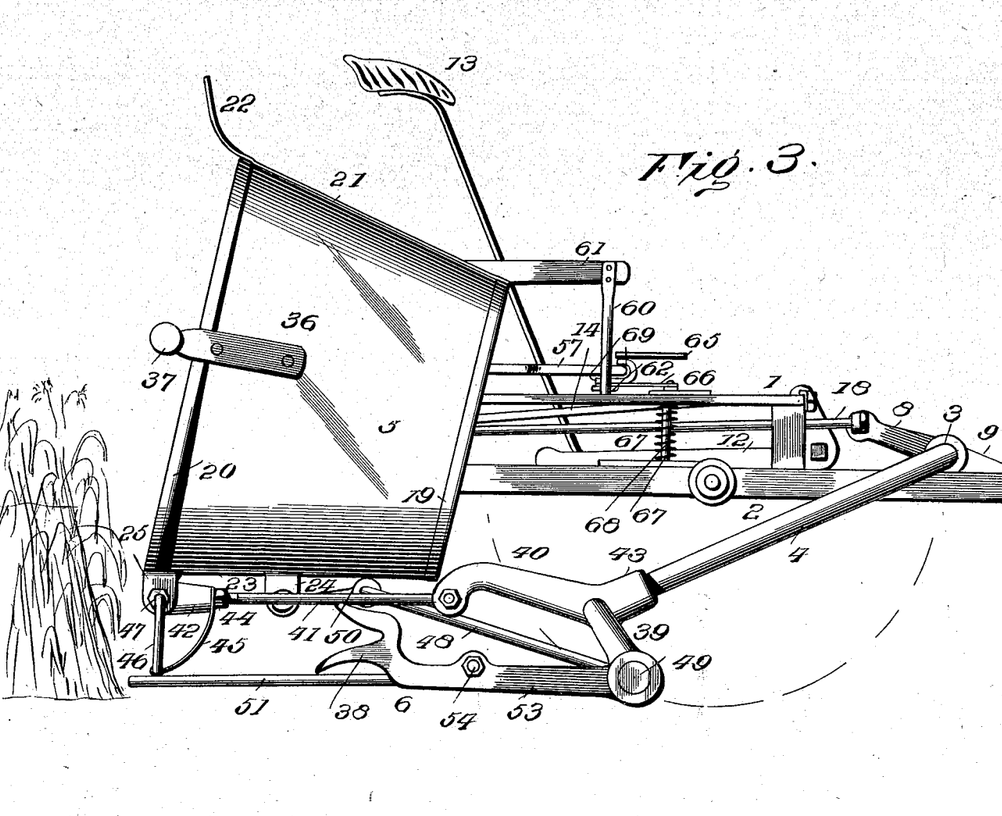
Fig. 3 is a view similar to Fig. 1, showing the disposition of the parts after the shock has been deposited upon the ground and prior to their return to a normal position.
Figure 4:
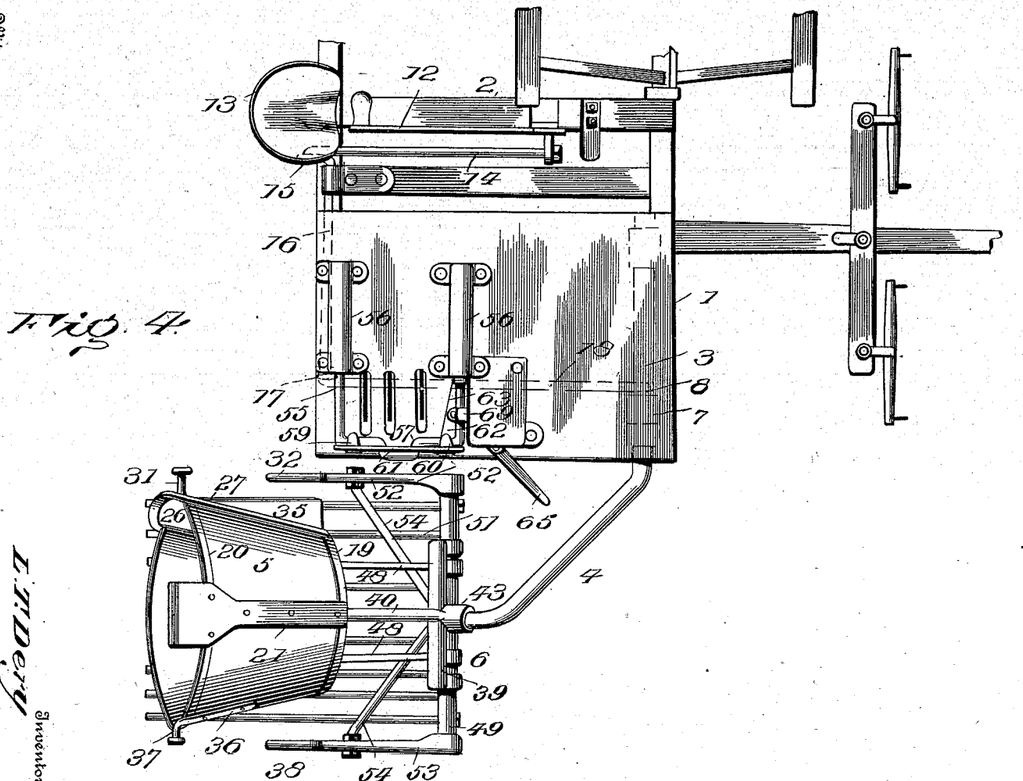
Fig. 4 is a top plan view showing the parts in the position in which they appear in Fig. 3.
Figure 8:
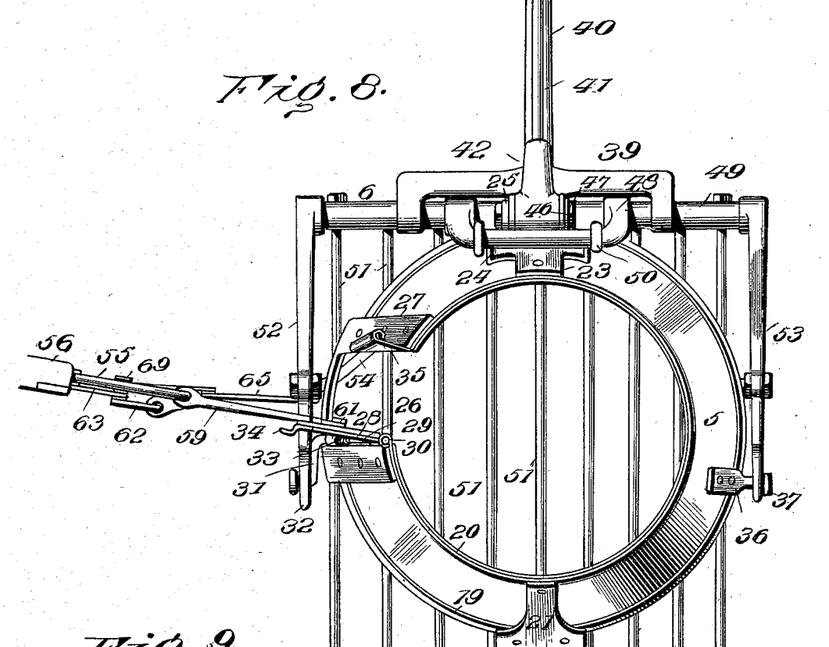
Fig. 8 is a rear view of the shock former, retainer, and support for the bundles when passing from the binder to the shock-former.
Figure 9:
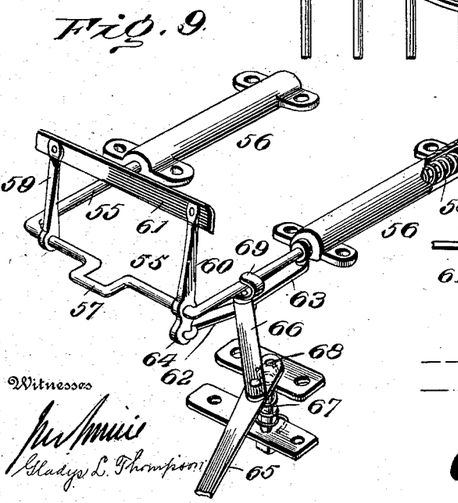
Fig. 9 is a perspective view of the bundle-support.
Figure 10:
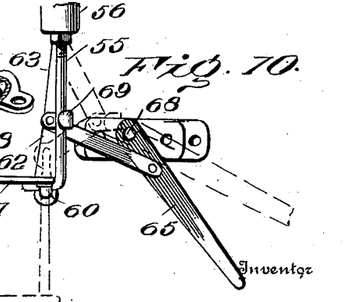
Fig. 10 is a detail view of the trip mechanism coöperating with the check of the bundle-support.

The retainer 6 has the form of a fork and comprises a cross bar or head 49 and a series of tines or rods 51, secured to the part 49 in any substantial way, so as to admit of ready displacement for any required purpose. This retainer normally occupies a vertical position, as indicated in Figs. 1, 6, and 8, and is arranged in front of the larger end of the shock-former 5, so as to hold the bundles or gavels in place during the formation of the shock. The retainer is pivotally supported in the arms of the yoke 39, carried by the arm 4 of the shaft 3, and has a toggle connection with the shock-former in the manner stated. By having the shock former and retainer connected in the manner set forth the shock-former is enabled to make a half-turn, the bottom portion being moved so as to occupy the topmost position, as indicated in Fig. 3, the extreme positions of the shock-former being shown in Figs. 1 and 3. During the movement of the shock-former the retainer 6 is withdrawn from in front of the shock-former and the latter is enabled to deposit the shock upon the ground, as indicated in Figs. 2 and 3, the retainer forming a support for the shock-former when the latter is in position indicated in Fig. 3. Arms 52 and 53 are located at the sides of the retainer and in the plane of the tines or rods 51 and are secured to the head or cross-bar 49. Braces 54 connect the arms 52 and 53 with the head 49, thereby stiffening and strengthening the retainer. The arm 52 terminates in the fork 32, which is adapted to engage the bent end 31 of the bar 29, and the arm 53 terminates in the fork 38, adapted to engage the off-standing part 37 at the outer side of the shock-former. When the parts are in normal position, the retainer stands in front of the shock-former and the forks 32 and 38 are in engagement with the outwardly-projecting parts 31 and 37, as indicated most clearly in Figs. 1, 5, 6, and 8.

The means for supporting the bundles or gavels during their transmission from the binder to the shock-former consist of the following instrumentalities, namely: a spring-actuated frame 55 of approximately U form and having its side members slidably mounted in keepers 56, secured to a convenient portion of the binder-deck. The cross-bar of the frame connecting the side members is formed with a crimp or bend 57 to clear the binder-post. A coil-spring 58 is mounted upon each side member of the frame 55 and is located in the keeper and is confined between an end of the keeper and a stop at the inner end of the member of the frame with which the spring coöperates. These springs 58 hold the frame 55 in a normal position and admit of its yielding to permit the packers or bundle-ejecting means of the harvester-binder clearing the bundle or bundles arrested in their movement to the shock-former when the load is being dumped or the shock deposited upon the ground. The means for arresting the advance of the bundle or bundles to the shock-former when the load is being discharged consist of arms 59 and 60, pivotally mounted upon the cross-bar of the spring-actuated frame 55, and a bar 61 connecting the outer ends of the said arms. Toggle-levers 62 and 63 connect an extension 64 of the arm 60 with the proximal side member of the spring-actuated frame, and a trip-lever 65 is connected, by means of a link 66, with the toggle-levers 62 and 63 and extends within the path of the arm 52, so as to be engaged thereby and hold the bundle-check about in the position shown in Figs. 5 and 8. The parts 59, 60, and 61 constitute the bundle check or arrester and when released occupies an approximately vertical position, as indicated most clearly in Figs. 2, 3, 4, and 9. The trip-lever 65 is spring-actuated and when released from the restraining influence of the arm 52 moves to a position so as to throw the check across the path of the bundles and arrest their advance to the shock-former. A spring 67 of proper strength coöperates with the lever 65 and is mounted upon the pin or shaft 68, carrying said lever, and normally exerts a pressure to throw the bundle-check upward when the lever 65 is released from the arm 52. A hook 69 is mounted upon the fastening connecting the toggle-levers 62 and 63 and is adapted to engage with the proximal side member of the spring-actuated frame 55, so as to limit the movement of the bundle check or arrester when thrown across the path of the bundles.

The attachment when applied to a harvester-binder and in position for reception of the bundles or gavels to form a shock appears about as shown in Figs. 1 and 5, the bundle check or arrester spanning the space formed between the spring-actuated frame 55 and the gate 28 and resting upon the latter, as indicated in Figs. 5 and 8. The shock-former occupies a horizontal position and the retainer a vertical position. The bundles when bound are caused to enter the shock-former by means of the packers or bundle-ejector of the harvester-binder, and when a sufficient number of bundles to form a shock have entered the shock-former the driver pulls the upper end of the lever 12 rearward, thereby causing a corresponding movement of the arm 4 of the shaft 3. During the initial movements of the parts the forks 32 and 38 are withdrawn from engagement with the outwardly-extending parts 31 and 37, and the trip-lever 65 is released from the restraining influence of the arm 52. The gate 28 closes automatically, and the check or bundle-arrester is automatically projected into position for retarding the movement of the bundles, as hereinbefore explained. The shock-former gradually assumes a vertical position and the retainer a horizontal position, as indicated in Fig. 2, thereby permitting the shock to be deposited upon the ground in a vertical position, as indicated in Fig. 3. As the retainer 6 assumes a horizontal position the shock-former folds thereover and is supported thereby, as indicated in Fig. 3. When the upper end of the lever 12 is pushed forward, the arm 4 is correspondingly moved and returns the parts to a normal position. As the parts assume a primal position the forks 32 and 38 engage the outwardly-extending parts 31 and 37 and the arm 52 comes in contact with the trip-lever 65, thereby opening the gate and throwing the bundle-arrester out of the way, so as not to obstruct the passage of the bundles to the shock-former, the operation being the same as herein described.

Having thus described the invention, what is claimed as new is—

1. In combination with a harvester-binder, means for carrying the bundles and forming the same into a shock, the same comprising the following instrumentalities, in combination, namely, a shock-former of frusto-conical form arranged with its axis to occupy an approximately horizontal position, a retainer arranged to extend vertically in front of the larger end of the shock-former and hold the bundles in place, operating means for turning the shock-former with its axis in a vertical position, and actuating means for moving the retainer from a vertical to a horizontal position at a less speed than the speed of the shock-former to admit of the latter clearing the retainer, whereby the shock is released and discharged upon the ground in a standing position, substantially as specified.

2. In combination, a shock-former, a retainer, toggle connections between the shock-former and retainer, a pivoted support having the retainer pivotally connected therewith, a swinging connection between said pivoted support and the shock-former, and actuating means, all coöperating to effect a simultaneous movement of the shock-former and retainer in the same direction at different speeds for proper positioning and discharge of the shock, substantially as set forth.

3. In combination, a support mounted for pivotal movement, a retainer having pivotal connection with said support, a shock-former, a rigid connection pivotally connecting the shock-former with the aforesaid support, and toggle connections between the shock-former and retainer, substantially as specified.

4. In combination, an arm mounted for pivotal movement, a retainer pivotally supported by said arm, a shock-former, a rigid connection pivotally connecting the shock-former with the arm, and toggle connections between the retainer and shock-former, substantially as described.

5. In combination, a pivoted support, a retainer pivotally connected with said support, a shock-former, a shoe at the lower side of the shock-former and having an end portion downwardly curved, a rigid connection pivotally connecting the shock-former and pivoted support, and toggle connections between the shock-former and the retainer, substantially as specified.

6. In combination, a pivoted support, a retainer having pivotal connection with the support, a shock-former, toggle connections between the shock-former and retainer, a rigid connection pivotally connecting the shock-former with the pivoted support, and a shoe at the end of the said rigid connection adjacent to the shock-former, substantially as set forth.

7. In combination, a pivoted support, a retainer pivotally connected with said support, a shock-former, a rigid connection pivotally connecting the shock-former with the pivoted support, and U-shaped frames constituting toggle connections between the retainer and shock-former, substantially as specified.

8. In combination, a shaft, an arm projected therefrom, a shock-former, pivotal connections between the said arm and shock-former, means for supporting the bundles and directing them into the shock-former, coöperating actuating means between the shock-former and bundle-supporting means, a counterbalancing-spring coöperating with the aforesaid shaft for sustaining the weight of the shock-former and adjunctive parts, and an operating-lever connected with said shaft to effect a discharge of the shock and a return of the parts to a normal position, substantially as set forth.

9. In combination, a shaft having an arm, a yoke applied to the end of said arm and provided with an upwardly-extended arm, a retainer journaled to the members of the yoke, a shock-former, a rigid connection pivoted to the shock-former and to the arm of the yoke, and toggle connections between the shock-former and retainer, substantially as specified.

10. In combination, a shock-former having a side opening, an automatically-closing gate coöperating with said opening, a part projected from the gate, a movable support for the shock-former, actuating means for the shock-former and its support, and a trip carried by the said support for engagement with the part extended from the gate to hold the latter open when the shock-former is in position to receive the bundles, substantially as described.

11. In combination, a shock-former having a side opening, a self-closing gate coöperating with said opening, a part projected from the gate, a pivoted support for the shock-former, actuating means for the shock-former and its support, and a trip movable with the support of the shock-former and adapted to engage with the projecting part of the gate to hold it open during the formation of the shock, substantially as set forth.

12. In combination, a shock-former having a side opening, a deflector extended outward from the upper side of the opening, an automatically-closing gate pivoted to the lower side of said opening and having a projecting part, and a trip for engaging the projecting part of the gate to normally hold the latter open, substantially as set forth.

13. In combination, a pivoted retainer, a pivotally-supported shock-former having a side opening, an automatically-closing gate coöperating with the side opening of the shock-former and having a projecting part, and an arm movable with the retainer for engagement with the projecting part of the gate to hold the latter open during the formation of the shock, substantially as set forth.

14. In combination, a pivotally-supported shock-former having a side opening, a gate for closing said opening, an extension projected outward from the axis of the gate, a pivotally-supported retainer, and an arm movable with the retainer and having a fork for engagement with the extension of the gate to hold the latter during the formation of the shock, substantially as specified.

15. In combination, a pivoted support, a retainer pivotally connected with the support, a shock-former, connections between the shock-former and respectively the said retainer and pivoted support, extensions projected from opposite sides of the shock-former, and forks at the sides of the said retainer for engagement with the said extensions of the shock-former, substantially as specified.

16. A shock-former having a side opening, metal bands reinforcing the ends of the shock-former, a frame reinforcing the side opening and connected with the said bands, a guard or deflector projected from the upper member of the frame, and an automatically-closing gate pivoted to the lower member of the said frame, substantially as described.

17. In combination, a shock-former having a side opening, reinforcing-bands at the ends of the shock-former, a frame reinforcing the side opening and attached to said bands, a guard projected from the upper member of the frame, an automatically-closing gate pivoted to the lower member of said frame, a shoe at the bottom side of the shock-former and attached to the end bands, and a reinforcing-strip at the top side of the shock-former and likewise connected to the said bands and adapted to have the supporting means connected thereto, substantially as specified.

18. In combination, a shock-former, a spring-actuated bundle-support, and a check carried by said spring-actuated bundle-support and adapted to arrest the movement of the bundles to the shock-former during the unloading movements thereof, substantially as specified.

19. In combination, a shock-former, a check for arresting the movements of the bundles to the shock-former during its unloading movements, toggle-levers coöperating with the said check, and a stop for limiting the movements of the check and toggle-levers, substantially as set forth.

20. In combination, a shock-former, a spring-actuated bundle-support, a check carried by the bundle-support and adapted to arrest the movement of the bundles to the shock-former during the unloading movements thereof, a trip, and means coöperating with the trip for throwing the check out of the path of the bundles when the shock-former is receiving the bundles, substantially as set forth.

21. In combination, a pivotally-supported shock-former, a pivoted retainer, a bundle-support comprising a spring-actuated frame, a check mounted upon the said frame and movable therewith and adapted to be automatically projected across the path of the bundles to arrest their movement to the shock-former, toggle-levers between the check and spring-actuated frame, a stop carried by the toggle-levers to limit their movement and the movement of the check, and a trip-lever adapted to be engaged by the retainer or a part thereof for holding the check out of the path of the bundles during the formation of the shock, substantially as specified.

In testimony whereof I affix my signature in presence of two witnesses.

LOUIE T. DERY. [L. S.]

Witnesses:
  HENRY J. DERY,
  B. F. BIGELOW.